No. 846,185. PATENTED MAR. 5, 1907.
C. CRANDALL.
ELECTRICAL INDICATING DEVICE.
APPLICATION FILED JUNE 2, 1906.

2 SHEETS—SHEET 1.

Witnesses:
H. L. Sprague
A. E. Peirce

Inventor:
Charles Crandall.
by Chapin & Co.
Attorneys.

No. 846,185. PATENTED MAR. 5, 1907.
C. CRANDALL.
ELECTRICAL INDICATING DEVICE.
APPLICATION FILED JUNE 2, 1906.

2 SHEETS—SHEET 2.

Witnesses:
H. L. Sprague
O. E. Pierce

Inventor:
Charles Crandall.
by Chapin & Co
Attorneys.

# UNITED STATES PATENT OFFICE.

CHARLES CRANDALL, OF NEWPORT, RHODE ISLAND.

ELECTRICAL INDICATING DEVICE.

No. 846,185.     Specification of Letters Patent.     Patented March 5, 1907.

Application filed June 2, 1906. Serial No. 319,823.

*To all whom it may concern:*

Be it known that I, CHARLES CRANDALL, a citizen of the United States of America, residing at Newport, in the county of Newport and State of Rhode Island, have invented new and useful Improvements in Electrical Indicating Devices, of which the following is a specification.

This invention relates to the class of automatic railway-signals, and particularly to that class known as "electrically-controlled" block-signal systems.

It has for its object to provide a mechanism by which the operator at the end of the line or section of the road may know at any time the position of any train on the road or section.

Broadly, the invention consists in insulating sections of each of the rails from each other and in placing the blocks of insulation in staggered relation, so that the truck of a small car, as a hand-car, will not operate the indicators or signals, but only when a long car or locomotive passes over the track will the signals be operated. This is accomplished by forming a closed circuit with the main battery to one section of an insulated rail through both trucks and the iron framework of the car and an insulated section of the other rail back to the other terminal of the battery. In this circuit is included the coils of a relay-electromagnet. This mode of connecting the sections is what I term a "bridged" connection. When this circuit is completed, the relay operates to throw in a local battery, which causes the current to flow through the coils of a solenoid, whereby a core is drawn into the solenoid, and this in turn brings into operation a second local battery, whereby a movable indicator is operated, displaying a number which indicates the number of the trains that have passed over that particular block or section, and when a second or third train passes over this block or section the indicator will be moved so as to display a corresponding number.

Figure 1:
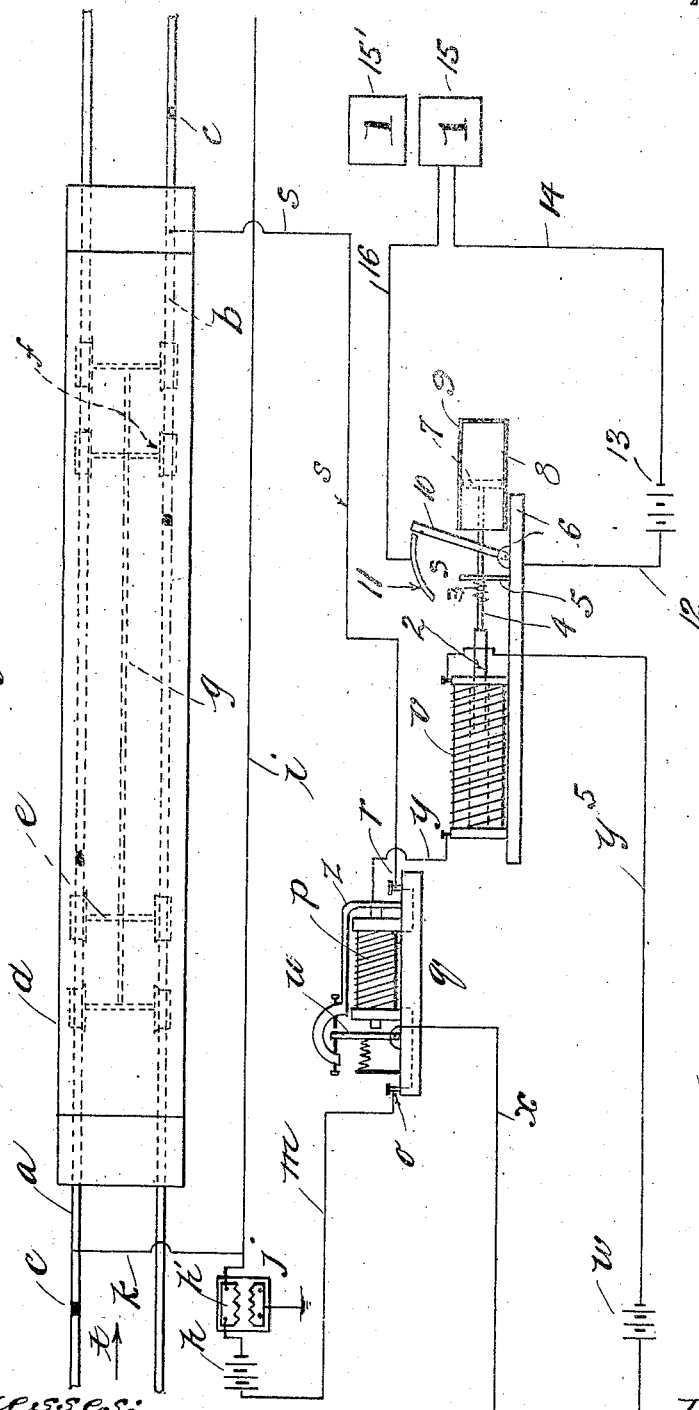
Figure 2:
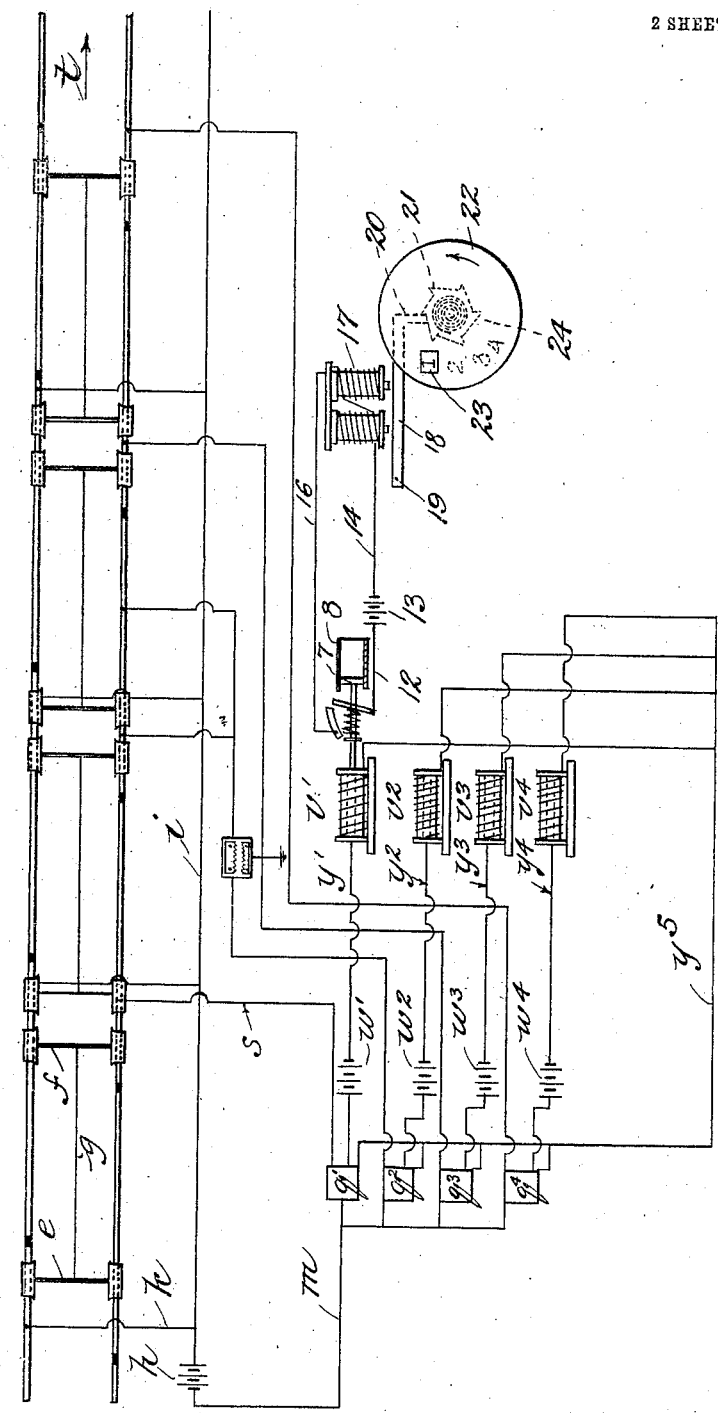

Referring to the drawings forming part of this application, Figure 1 is a plan view representing one block of the road and showing the connections with the relay-solenoid and indicator mechanism and the corresponding batteries and circuits for these parts of my signaling system. Fig. 2 shows the connections for four blocks of road and a detailed figure of my indicator mechanism.

Referring to these drawings in detail, $a$ and $b$ designate two of the sections of the rails that are insulated from the adjacent section by the blocks of insulation, (shown at $c$.)

$d$ designates the outline of the car-body.

$e$ and $f$ designate the two trucks of the car.

$g$ designates as a whole the framework connecting the two trucks and is generally the part of the iron framework of the car.

$h$ designates the main battery, which is located at the end of the line or section and has a wire $i$, (which I term the "main-current wire,") extending the whole length of the road or section. This wire passes through a lightning-arrester, (designated by $j$.)

$k$ designates a wire connected to the main wire $i$ and to the section $a$ of the rail. The opposite terminal of the main battery is connected by a wire $m$, which leads to a binding-post $o$, that is connected with an electromagnet $p$ of the relay $q$. $r$ designates the other terminal of the electromagnet $p$ and has a wire $s$, that is connected to the insulated section $b$ of the opposite rail.

The operation of this part of my apparatus is as follows: The car being in the position shown, the current passes from the main battery $h$ to the upper plate $h'$ of the lightning-arrester $j$, to section $a$ of the rails, to the rear truck $e$, (the car being supposed to be traveling in the direction of the arrow $t$,) through the framework $g$ of the car, to the forward truck $f$, and from there to the insulated section $b$ of the opposite rail by the wire $s$, back to the terminal post $r$, through the coils of the electromagnet $p$, the binding-post $o$, and to the other terminal of the battery $h$. This closed circuit operates the armature $u$ of the electromagnet $p$, which energizes the solenoid $v$ by current passing from the local battery $w$ through the wire $x$, through the armature $u$, wire $y$, (which is connected between one terminal of the solenoid $v$,) through the framework $z$ of the relay, and back by the wire $y^5$ to the other pole of the battery $w$. When this circuit is closed, the core 2 is drawn into the solenoid $v$ against the tension of the spring 3, one end of which is connected to the rod 4 of the core and the other end bears against the upright 5, that is connected with the base 6 of the solenoid. The opposite end of the rod 4 carries the piston 7, that moves in the cylinder 8, which has a venthole 9 at one end thereof, so as to permit the return movement of the piston 7 at a slow speed.

Connected with the base 6 and the rod 4 is a switch-arm 10, that is adapted to be drawn into contact with an arch-shaped piece of metal 11, so as to form an electrical contact with the arm 10.

12 indicates a wire connected to the arm 10 and a second local battery 13. 14 designates a wire leading from the other terminal of the battery 13 to the movable indicator, (designated as a whole by the numeral 15,) the details of which will be described farther on.

16 designates a wire extending from the element 15 to the metal plate 11.

By reason of the dash-pot arrangement the movement of the switch-arm 10 is quick acting when the circuit through the solenoid $v$ is closed and is slow acting when this circuit is broken. The purpose of this construction is to keep the number of the indicator in a steady position until all of the cars of the train have passed over this particular block, or, in other words, the switch arrangement for operating the indicators is quick closing and slow opening.

Referring to Fig. 2, in which I have shown my system connected up for four blocks of the road, I have shown in detail therein the construction of the movable indicating mechanism which is diagrammatically shown at 15 in Fig. 1, while 15' designates the permanent indicating device. 17 designates an electromagnet that is connected in the second local circuit (shown in Fig. 1 and designated by the numerals 10, 11, 12, 13, 14 and 16.) 18 designates an armature for the electromagnet 17, pivoted at the point 19. The forward end of this armature 18 has a detent 20 integral therewith for engaging teeth 21 for holding the indicator mechanism in a temporary fixed position. 22 designates a rotatable disk, having openings 23 cut therein for the purpose of displaying the numerals "1, 2, 3, 4," &c., that are placed on a fixed support back of the movable member 22, as the same is permitted to be stepped around by the movements of the armature 18. 24 designates a coiled spring that is connected to a clock-train, thus placing the disk 22 under tension, causing the same to rotate when the armature 18 is attracted, as readily understood.

In Fig. 2 I have diagrammatically shown the several relays $q$ at $q'$, $q^2$, $q^3$, and $q^4$ for the several sections, and $v'$, $v^2$, $v^3$, and $v^4$ the solenoids of the several sections for the first local circuit, with a common return-wire $y^5$ back to the several local batteries $w'$, $w^2$, $w^3$, and $w^4$ of the first local circuit through the wires $y'$, $y^2$, $y^3$, and $y^4$. Only one of the indicating devices is shown in detail in Fig. 2, but it is obvious how they may be connected without going into detail.

Briefly stated, the operation of my block-signal system is as follows: When a train reaches the first block and operates the relay $q$, which closes the first local circuit to the solenoid $v$, that in turn closes the second local circuit, whereby the electromagent 17 is energized allowing the disk 22 to rotate one step and indicate or display the numeral "1," which shows that train number 1 over the first block has reached this point in its travel, and when train number 1 reaches the second, third, and fourth blocks the several indicators (only one of which is shown in Fig. 2) that are connected in the circuits with these blocks will each in turn display the numeral "1" as the train number 1 advances from block to block. Should a second train enter block number 1, the indicating device that is operated through the relay and first and second local batteries that is connected with block number 1 will display the numeral "2," thus showing to the operator that train number 2 has reached block number 1, and so on. The second train as it reaches the second, third, and fourth blocks in succession will move the corresponding indicators from the numeral "1" so as to display the numeral "2." It will therefore be seen that I have devised a simple and efficient means whereby any train can be accurately located with reference to any particular block of the road.

I claim—

1. In a signal system, a series of rail-sections insulated from each other, said sections being placed in staggered relation, a main battery, a relay, a main-current wire extending the length of the road, a lightning-arrester therein, and connections with the opposite sections of the insulated rails with the main-current wire and the relay whereby when the trucks of a car engage the oppositely-arranged insulated rail-sections, a circuit is formed through said sections, the trucks of the car, and relay; local circuits operatively arranged with relation to the relay, and means for indicating the position of the car, said means being actuated by the local circuits.

2. In a signal system, a main-current wire extending the entire length of the road or section, a main battery, insulated rail-sections placed in staggered relation to each other, a relay, one terminal of the main battery being connected with the coil of the relay, the other terminal of said battery being connected to the main-circuit wire and to one section of the rail-sections, a wire leading from the oppositely-disposed insulated rail-sections to the relay, whereby the staggered rail-sections are bridged by the trucks of a car when the same enters the section, and means for indicating the number of the section and the number of the train.

3. In a signal system, a main-current wire extending the entire length of the road or section, a main battery, insulated rail-sections placed in staggered relation to each other, a relay, one terminal of the main battery being connected with the coil of the relay, the other terminal of said battery being connected to the main-circuit wire and to one rail-section, a wire leading from the oppositely-disposed insulated sections to the relay, whereby the staggered rail-sections are bridged by the trucks of a car when the same enters the sections, a local circuit, a battery for the same, a solenoid connected with one terminal of the local battery and with the framework of the relay, the second terminal of the local battery being connected to the armature of the relay, and a quick-closing switch operated by the core of the solenoid, whereby a second local circuit is closed, and indicating means in said local circuit for determining the position of a train with reference to the respective sections of the road.

4. In a signal system for railways, the opposite rails of which are placed in staggered relation and the sections of each rail being insulated from each other, a main battery and two local batteries, a relay operated by the two trucks of a car and engaging oppositely - disposed rail-sections, electrical connections between the oppositely-disposed rails and the relay and main battery, a solenoid included in the circuit of the first local battery and connected to the terminals of the same, the armature and framework of the relay being included in the circuit of the first local battery, the quick closure and slow opening switch mechanism being operated by the core of the solenoid, and electrical connections from the second local battery to an indicating mechanism, an electromagnet energized by the current on the second local battery, and means operatively connected with the armature of the second electromagnet for displaying the numerals corresponding with the respective rail-sections of the road when the insulated sections of the road are "bridged" by the two trucks of a car.

CHARLES CRANDALL.

Witnesses:
 W. O. MILNE,
 JAMES E. MATHEWSON.